United States Patent Office.

SMITH A. SKINNER, OF HOOSICK FALLS, NEW YORK.

CORDAGE AND TWINE DESIGNED TO BE USED IN BINDING SHEAVES OF GRAIN.

SPECIFICATION forming part of Letters Patent No. 255,040, dated March 14, 1882.

Application filed April 26, 1880. (Specimens.)

*To all whom it may concern:*

Be it known that I, SMITH A. SKINNER, of the village of Hoosick Falls, in the county of Rensselaer and State of New York, have invented certain Improvements in Cordage and Twine designed to be used in Binding Sheaves of Grain, of which the following description constitutes a specification.

The nature of this invention consists in rendering any cordage or twine made from vegetable fiber, and suitable for use in binding sheaves of cut grain, proof against simultaneous attacks of insects and vermin, like crickets, grasshoppers, mice, &c., and the ravages of fermentation, mildew, rot, or decay.

Experience heretofore had with string or twine bands for bundles of grain has demonstrated that under certain conditions the crickets and grasshoppers will attack the bands and eat them in two and destroy them. Especially has this occurred while the grain has been stacked in the field. And sometimes mice will work in the stacks, either in the field or under cover, and gnaw off such binding cords or bands. Under other circumstances in wet seasons, or when the accumulated bound grain is exposed to dampness or rain, a tendency to heat supervenes and the twine bands will mildew and rot, so that they easily break, thus letting loose the contents of the bundle and necessitating the delay and expense of rebinding. Again, when large quantities of the binding-twine are stored preparatory for use, under favorable conditions, spontaneous combustion, as a result of heat and fermentation, sometimes ensues, while at the same time exposed to the ravages of insects and vermin, as before stated.

This invention has for its object to fortify such twine against disintegration from either and all the above-named causes, whether occurring concurrently or successively. To accomplish both objects the twine is treated by saturation preferably with a solution of any salt which is distasteful to such insects and vermin. For this purpose alum, sulphate of copper or zinc, acetate of lead, and other analogous substances are suitable, the object being to leave adhering among the fibers of the twine, after evaporation has taken place, a sufficient amount of the crystallized or deposited salt to render the twine quite pungent or acrid to the taste. This quality so imparted to the twine renders it repellent to attacks of insects and vermin. In addition to this the twine is then saturated or treated with any of the liquid hydrocarbons which are antiseptic, and have the characteristics of resisting fermentation or oxidation. As proper substances for this purpose may be mentioned kerosene-oil, paraffine, vaseline, coal-tar, &c. After such saturation or antiseptic treatment the excess of hydrocarbon is expressed from the twine, so as to render it fit to handle and run through the binding apparatus. One advantage of this treatment consists in lubricating the twine so that it will run easily through the various grooves, guides, and eyes of the binding machinery, and keep them so lubricated that they will not rust.

I am aware that fabrics made from vegetable fiber have heretofore been treated separately by substantially the same substances hereinbefore enumerated for objects similar to the purposes before mentioned, and I do not therefore lay claim to either branch of the treatment considered by itself as new; but inasmuch as a stack of bound grain is subject to attack by insects which destroy the twine bands in the dry parts of the stack, while at the same moment of time other portions of the stack are undergoing damage from exposure to the rain, to the ground, or to water, tending to mildew and rot the bands around the sheaves, I have devised the before-described joint treatment with a salt and a hydrocarbon, so that the twine forming the band may be ever fortified against either destructive agency, however it may present itself whether alone or otherwise. Hence

I claim—

An improved cord or twine for binding sheaves of grain, adapted to simultaneously resist attacks of mice, crickets, grasshoppers, and like vermin, by containing among its fibers a deposit of sulphate of zinc or other analogous material which is repugnant to the taste of such vermin or insects, and to resist the ravages of rot, decay, and spontaneous combustion, by having been treated with a hydrocarbon, substantially as specified.

In testimony whereof I have hereunto subscribed my name this 21st day of April, A. D. 1880.

SMITH A. SKINNER.

In presence of—
W. F. PETERS,
FRANKLIN SCOTT.